United States Patent
Shibazaki (10) Patent No.: US 7,626,645 B2
(45) Date of Patent: Dec. 1, 2009

(54) OPTICAL MODULATION METHOD FOR A LIQUID CRYSTAL LAYER AND LIQUID CRYSTAL DEVICE USING THE METHOD

(75) Inventor: Minoru Shibazaki, Kobe (JP)

(73) Assignee: TPO Hong Kong Holding Limited, Shatin (HK)

( * ) Notice: Subject to any disclaimer, the term of this patent is extended or adjusted under 35 U.S.C. 154(b) by 492 days.

(21) Appl. No.: 10/556,328

(22) PCT Filed: Apr. 28, 2004

(86) PCT No.: PCT/IB2004/050532

§ 371 (c)(1),
(2), (4) Date: Nov. 10, 2005

(87) PCT Pub. No.: WO2004/102260

PCT Pub. Date: Nov. 25, 2004

(65) Prior Publication Data

US 2006/0203320 A1    Sep. 14, 2006

(30) Foreign Application Priority Data

May 16, 2003  (JP) .............................. 2003-139279

(51) Int. Cl.
*G02F 1/133* (2006.01)
*G02F 1/1335* (2006.01)

(52) U.S. Cl. ....................... 349/33; 349/34; 349/113; 349/114; 349/119; 349/136

(58) Field of Classification Search ................. 349/18, 349/34, 113, 114, 117, 119, 136, 177, 181, 349/33, 123; 345/50, 87, 89; 359/245, 246, 359/247, 252, 256
See application file for complete search history.

(56) References Cited

U.S. PATENT DOCUMENTS

| | | | |
|---|---|---|---|
| 5,245,455 A * | 9/1993 | Sayyah et al. ................. 349/27 |
| 5,640,259 A * | 6/1997 | Sawayama et al. ............ 349/33 |
| 6,801,285 B1 * | 10/2004 | Shi et al. .................... 349/128 |
| 2002/0041351 A1 | 4/2002 | Baek | |

2003/0189538 A1 * 10/2003 Ide .............................. 345/87

FOREIGN PATENT DOCUMENTS

| EP | 0 294 899 | 12/1988 |
|---|---|---|
| EP | 0 463 816 | 1/1992 |

OTHER PUBLICATIONS

Breddeis et al., "An Analytical Expression for the Optical Threshold in Highly Twisted Nematic Systems with Nonzero Tilt Angles at the Boundaries", J. Appl. Phys. vol. 58, No. 6, Sep. 15, 1985, pp. 2162-2166.

* cited by examiner

*Primary Examiner*—Dung Nguyen
*Assistant Examiner*—Tai Duong
(74) *Attorney, Agent, or Firm*—Liu & Liu

(57) ABSTRACT

An object of the invention is to satisfactorily present a bright state and a dark state with a low driving voltage without changing a liquid crystal material. A liquid crystal device 100 having a configuration wherein a polarizing plate 11, a liquid crystal layer 14 and an optical reflective layer 15 are arranged in this order from the front side of the device. The liquid crystal layer 14 is capable of providing one retardation when the liquid crystal layer is applied with a predetermined high voltage and providing the other retardation when the liquid crystal layer is applied with a predetermined low voltage, for light that is incident from the polarizing plate 11, passes through the liquid crystal layer, reflects on the optical reflective layer 15, passes again through the liquid crystal layer 14 and is guided to the polarizing plate 11, whereby a bright state and a dark state are presented based on a difference between these retardations. A thickness of the liquid crystal layer and/or a pre-tilt angle of liquid crystal molecules of the liquid crystal layer is made to be greater than in the case where the one and the other retardations are provided, so that a difference between a first retardation obtained by applying the liquid crystal layer with a modified high voltage lower than the predetermined high voltage and a second retardation obtained by applying the liquid crystal layer with a modified low voltage equal to or higher than the predetermined low voltage, for example is made to be substantially half of wavelength of the light.

13 Claims, 6 Drawing Sheets

OPTICAL MODULATION METHOD FOR A LIQUID CRYSTAL LAYER AND LIQUID CRYSTAL DEVICE USING THE METHOD

BACKGROUND OF THE INVENTION

1. Field of the Invention

The present invention generally relates to an optical modulation method for a liquid crystal layer. The invention relates to a liquid crystal device or liquid crystal display device using such an optical modulation method. The invention also relates to a driving method for a liquid crystal layer whose liquid crystal molecules forming the upper and bottom surfaces of the layer have their alignment directions parallel to each other for the upper and the bottom, and to a liquid crystal device or liquid crystal display device based on the driving method.

2. Description of the Related Art

Conventionally, there have been proposed various methods for reducing power consumption in a liquid crystal display device. The liquid crystal display device is comprised of a variety of structural elements, and in terms of each of the structural elements, many kinds of methods are considered for reducing power consumption. For example, there is a method for reducing power consumption using a liquid crystal material capable of being driven with a low voltage, and such a method has been tried on various kinds of liquid crystal materials.

However, the method, first of all, requires a great deal of time and efforts to find a new liquid crystal material capable of being driven with a desired low voltage. Further, even if such a new material was found, there would be cases where its reliability is in doubt in other technical aspects, for example, about whether the durability, operation stability and more are adequate.

Meanwhile, in an information display terminal such as a recent portable device or a so-called wearable device, there are increasingly growing needs for power saving. More user-friendly products are demanded that allow many hours of operation in a limited power supply capacity and do not force users to perform frequent battery charging. Further, from another point of view, such awareness is increased over the society that power saving of products leads to saving of power resources and therefore has a favorable impact on our global environment.

SUMMARY OF THE INVENTION

The present inventor noted parameters of a liquid crystal layer except material characteristics, in order to enable driving of the liquid crystal layer with a low voltage. If low-voltage driving could be achieved by devising a method of setting the parameters, a power consumption reducing technique would be established in a wide range of application irrespective of kinds of liquid crystal materials. Besides, there is an acknowledgment that such a technique should be applicable to any types of liquid crystal display devices that have already been in practical use nowadays, without any restrictions.

The present invention has been made in view of the foregoing, its object is to provide an optical modulation method for a liquid crystal layer and a liquid crystal device using the method, which can satisfactorily present a bright state and a dark state with a low driving voltage without changing a liquid crystal material.

Another object of the invention is to provide an optical modulation method for a liquid crystal layer and a liquid crystal device using the method, which can reliably present a bright state and a dark state without changing a liquid crystal material while contributing to reduction of power consumption.

A further object of the invention is to provide reflective type, transmissive type and transflective type liquid crystal devices which can contribute to reduction of power consumption without changing a liquid crystal material.

In order to achieve the aforementioned objects, an optical modulation method for a liquid crystal layer according to an aspect of the present invention is an optical modulation method for a liquid crystal layer, using a liquid crystal layer capable of providing one retardation through application of a predetermined high voltage and providing the other retardation through application of a predetermined low voltage, whereby a predetermined difference between the one and the other retardations can provide predetermined dark and bright states, wherein: by making a thickness of the liquid crystal layer and/or a pre-tilt angle of liquid crystal molecules of the liquid crystal layer to be greater than that of the liquid crystal layer in the case of provision of the one and the other retardations, the value of the predetermined difference is obtained by a difference between a first retardation obtained by applying the liquid crystal layer with a modified high voltage lower than the predetermined high voltage and a second retardation obtained by applying the liquid crystal layer with a modified low voltage equal to or higher than the predetermined low voltage, or by a difference between a first retardation obtained by applying the liquid crystal layer with a modified high voltage equal to or lower than the predetermined high voltage and a second retardation obtained by applying the liquid crystal layer with a modified low voltage higher than the predetermined low voltage.

In this way, it is possible to decrease the maximum driving voltage of the liquid crystal layer and to narrow a driving voltage range, and thereby contribute to power saving. In addition, since this method is not dependent on characteristics of the liquid crystal material in itself, it is possible to provide a power saving technique having its broad scope of application. More specifically, the difference is substantially 5 V between the predetermined high voltage and the predetermined low voltage, and the liquid crystal layer conventionally driven in a range of 5 V can be driven with a voltage less than 5 V without changing the capability of presenting a bright state and a dark state.

Also in order to achieve the above-mentioned objects, a liquid crystal device according to another aspect of the present invention is a liquid crystal device having a configuration wherein, at least, a front polarizing plate, a liquid crystal layer and an optical reflective layer are arranged in this order from the front side of the device, the liquid crystal layer being capable of providing one retardation when the liquid crystal layer is applied with a predetermined high voltage and providing the other retardation when the liquid crystal layer is applied with a predetermined low voltage, for light that is incident from the front polarizing plate, passes through the liquid crystal layer, reflects on the optical reflective layer, passes again through the liquid crystal layer and is guided to the front polarizing plate, whereby a bright state and a dark state can be presented based on a difference between these retardations, wherein a thickness of the liquid crystal layer and/or a pre-tilt angle of liquid crystal molecules of the liquid crystal layer is made to be greater than in the case where the one and the other retardations are provided, so that a difference between a first retardation obtained by applying the liquid crystal layer with a modified high voltage lower than the predetermined high voltage and a second retardation obtained by applying the liquid crystal layer with a modified low voltage equal to or higher than the predetermined low voltage, or a difference between a first retardation obtained by applying the liquid crystal layer with a modified high voltage equal to or lower than the predetermined high voltage and a second retardation obtained by applying the liquid crystal layer with a modified low voltage higher than the predetermined low voltage is made to be a value of substantially half of a wavelength of the light.

It is thereby possible to suppress the driving energy of the liquid crystal layer and thus contribute to reduction of power consumption in the entire device.

Furthermore, in order to achieve the above-mentioned objects, a liquid crystal device according to a further aspect of the present invention is a liquid crystal device having a configuration wherein, at least, a front polarizing plate, a liquid crystal layer and a rear polarizing plate are arranged in this order from the front side of the device, the liquid crystal layer being capable of providing one retardation when the liquid crystal layer is applied with a predetermined high voltage and providing the other retardation when the liquid crystal layer is applied with a predetermined low voltage, for light that is incident from the rear polarizing plate, passes through the liquid crystal layer, and is guided to the front polarizing plate, whereby a bright state and a dark state can be presented based on a difference between these retardations, wherein a thickness of the liquid crystal layer and/or a pre-tilt angle of liquid crystal molecules of the liquid crystal layer is made to be greater than in the case where the one and the other retardations are provided, so that a difference between a first retardation obtained by applying the liquid crystal layer with a modified high voltage lower than the predetermined high voltage and a second retardation obtained by applying the liquid crystal layer with a modified low voltage equal to or higher than the predetermined low voltage, or a difference between a first retardation obtained by applying the liquid crystal layer with a modified high voltage equal to or lower than the predetermined high voltage and a second retardation obtained by applying the liquid crystal layer with a modified low voltage higher than the predetermined low voltage is made to be a value of substantially half of a wavelength of the light.

In this way, the same advantage can be brought to the transmissive type liquid crystal device. In this aspect, the liquid crystal device may further comprises an optical reflective layer which is placed between the liquid crystal layer and the rear polarizing plate and partially formed in an area along a primary surface of the liquid crystal layer facing the rear polarizing plate, wherein in the area occupied by the optical reflective layer, the liquid crystal layer provides the first retardation when the liquid crystal layer is applied with the modified high voltage and provides the second retardation when the liquid crystal layer is applied with the modified low voltage, for reflecting path light which is incident from the front polarizing plate, passes through the liquid crystal layer, reflects on the optical reflective layer, again passes through the liquid crystal layer and is guided to the front polarizing plate. This leads to a transflective type liquid crystal device.

In each aspect described above, the device may have phase compensation means between the front polarizing plate and the liquid crystal layer, and/or between the liquid crystal layer and the rear polarizing plate. It is thus possible to obtain extremely excellent performance in practical use.

In the transflective type liquid crystal device, an area corresponding to the optical reflective layer may be used for an optical reflective area within a pixel, and other area than the optical reflective area may be used for an optical transmissive area within the pixel, whereby display based on pixels can be carried out in both a reflective mode and a transmissive mode.

Further, the liquid crystal layer may consist of a liquid crystal material including liquid crystal molecules forming one surface of the liquid crystal layer and liquid crystal molecules forming another surface of the liquid crystal layer, where each alignment direction of the molecules is substantially parallel to the other. In this case, it is possible to have the advantage of a liquid crystal layer of a type in which liquid crystal molecules do not have twist alignment.

Excellent results are obtained by using the liquid crystal layer which consists of a liquid crystal material of a parallel alignment type, and has a thickness which provides a retardation of 300 to 500 nm for the light under no application of electric field, or by using the liquid crystal layer which consists of a liquid crystal material of a parallel alignment type, where a pre-tilt angle of liquid crystal molecules of the liquid crystal layer is from 6 to 30 degrees. Further, the device may be specified such that a difference between the predetermined high voltage and the predetermined low voltage is substantially 5 V. Furthermore, an excellent result is obtained that a difference between the modified high voltage and the modified low voltage is substantially 2.5 V.

There are various ways to set the modified high voltage and low voltage. As a remarkable feature in one aspect of the present invention, it is provided that at least one of the modified high voltage and the modified low voltage is in a transition area between the vicinity of value of the first retardation and the vicinity of value of the second retardation on a characteristic curve of voltage vs. retardation or its equivalent characteristic curve which is shown by the liquid crystal layer whose thickness and/or pre-tilt angle has been made to be increased so as to present the first and second retardations.

DESCRIPTION OF THE PREFERRED EMBODIMENT(S)

The above-mentioned aspects and other forms of the present invention will be described in more detail hereinbelow by way of embodiments with reference to drawings.

First Embodiment

Figure 1:
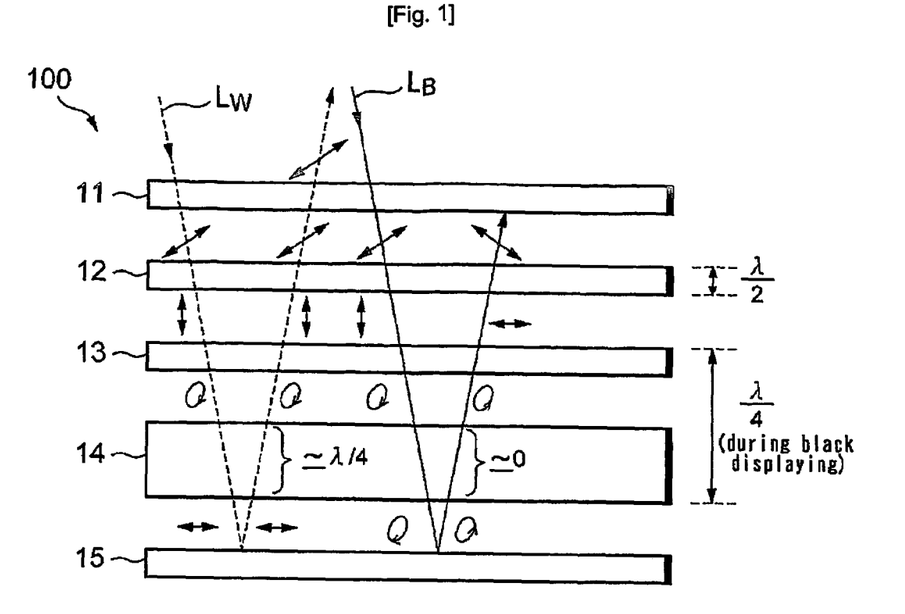
FIG. 1 is a cross sectional view showing a general construction of a liquid crystal display device according to one embodiment of the invention.

FIG. 1 schematically shows a sectional construction of a liquid crystal display device according to one embodiment of the invention.

A liquid crystal display device 100 is a reflective type liquid crystal display device, and has an arrangement of a linearly polarizing plate 11, a first retardation film 12 that is a half-wave plate, a second retardation film 13 that is a quarter-wave plate, a liquid crystal layer 14 which is sandwiched by a pair of electrodes (not shown) that apply a voltage corresponding to pixel information to be displayed, and an optical reflective layer 15, in this order from the front side that is the display screen side. The linearly polarizing plate 11, and the first and second retardation films 12, 13 forms means having a function of the right-hand or left-hand circular polarization. It is noted that only principal structure elements are described herein for the sake of clarity of description, but other structural elements may be actually included in the display device 100.

The first retardation film 12 has a fixed retardation of a substantially half of wavelength $fÉ$ of incident light, i.e., a value of $fÉ/2$. It is assumed that such incident light is the light with a wavelength in a range of about 380 nm to 780 nm The liquid crystal layer 14 has a liquid crystal material of a parallel alignment type.

Figure 2:
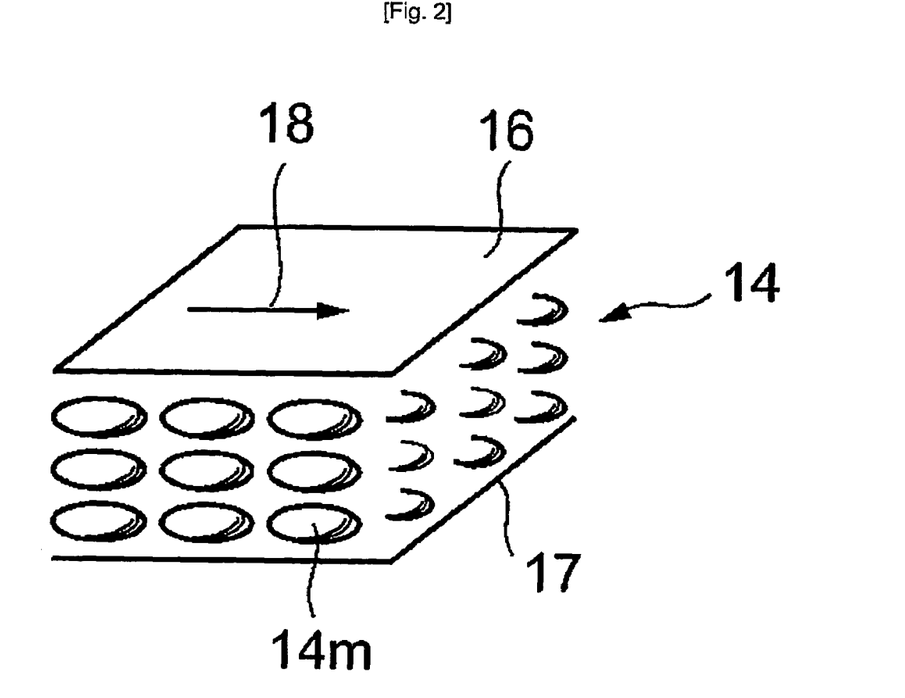
FIG. 2 is a schematic perspective view showing a construction of a parallel alignment type liquid crystal layer applied to the invention.

More specifically, the liquid crystal layer 14 has a molecular order as shown in FIG. 2, in which all the liquid crystal molecules 14m are basically aligned along a rubbing direction 18 of upper and lower alignment layers 16 and 17 that determine the initial alignment of the liquid crystal molecules 14m. In other words, the major axis of a refractive-index ellipsoid (indicatrix) of the liquid crystal molecules 14m is made parallel to the rubbing direction 18 namely, the director of the liquid crystal molecules 14m is made parallel to the rubbing direction 18. It is noted that the rubbing directions 18 of the alignment layers 16 and 17 are set to the direction ((initial) alignment direction) in which the liquid crystal layer 14 is aligned in this example, but instead of such rubbing, other methods may be used to determine the alignment direction.

In the liquid crystal layer of such a parallel alignment type or homogeneous alignment type (hereinafter, which is collectively referred to as a parallel alignment type), with respect to the upper and lower substrate surfaces sandwiching the liquid crystal layer, all the liquid crystal molecules are basically aligned in parallel and in the same direction under a predetermined reference electric field (for example, no electric field). In other words, the direction of the director of the liquid crystal molecules is substantially parallel to the substrate surfaces. Therefore, it is possible to recognize the average tilt angle of the liquid crystal molecule with more accuracy and ease in the parallel alignment type than in other types. Further, the parallel alignment type liquid crystal layer does not need an additional condition for alignment control, such as a bias voltage required, e.g. for a bend alignment type liquid crystal layer, and thus has an advantage of enabling a relatively easy mode in alignment control.

Referring to FIG. 1 again, the second retardation film 13 and liquid crystal layer 14 are assumed to have, as a whole, a retardation of substantially one-fourth the wavelength ($fÉ/4$) of incident light in black display operation (dark state) of the device 100.

As shown by solid line $L_B$ in FIG. 1, external light incident on the liquid crystal display device 100 first passes through the linearly polarizing plate 11 to be linearly polarized light, next passes through the first retardation film 12 for being provided with the retardation of $fÉ/2$ to become linearly polarized light in a changed predetermined direction. Then, the linearly polarized light enters the second retardation film 13 to be right-hand (or left-hand) elliptically polarized light, and is guided to the liquid crystal layer 14. In the black display operation (dark state), the retardation of the liquid crystal layer 14 is almost zero (in this example, in a range of about 30 nm to 80 nm to obtain circularly polarized light) as a reference value, and right-hand (or left-hand) circularly polarized light reaches the optical reflective layer 15 (the first half of the path is as described above). On the second half, the light from the liquid crystal layer 14 is reflected by the optical reflective layer 15, and it becomes left-hand (or right-hand) circularly polarized light there in the reverse direction, before entering the liquid crystal layer 14. After the light passes through the liquid crystal layer 14 again, it becomes elliptically polarized light in a direction which is obtained by reversing the elliptically polarized light having been incident on the liquid crystal layer 14 on the first half, and enters the second retardation film 13. The second retardation film 13 converts the reflected elliptically polarized light into linearly polarized light in a polarization direction perpendicular to the polarization direction of the linearly polarized light having been incident on the second retardation film 13 on the first half. When the linearly polarized light passes through the first retardation film 12, the light is provided with the retardation of $fÉ/2$ and converted into linearly polarized light in a polarization direction perpendicular to the polarization direction of the linearly polarized light having been incident on the first retardation film 12 on the first half, and guided to the polarizing plate 11. Since the polarizing plate 11 has an absorption axis just parallel to the polarization direction of the linearly polarized light, the light incident from the first retardation film 12 is intercepted (absorbed) without coming out of a screen of the device 100, and thus the black display is presented.

Meanwhile, in white display operation (bright state), as shown by broken line $L_W$ in FIG. 1, similarly, right-hand (or left-hand) elliptically polarized light is incident on the liquid crystal layer 14. At this time, the liquid crystal layer 14 has a retardation of $fÉ/4$ (about 150 nm to 250 nm) as a difference from the above-mentioned reference value, and guides linearly polarized light in a predetermined polarization direction to the optical reflective layer 15 (the first half is as described above). On the second half, the optical reflective layer 15 reflects the linearly polarized light, and returns the reflected light with its polarization direction remaining the same to the liquid crystal layer 14 since it is a kind of linearly polarized light. The liquid crystal layer 14 converts the reflected linearly polarized light into right-hand (or left-hand) elliptically polarized light in the same direction as that of the elliptically polarized light having been incident on the layer 14 on the first half, based on its own retardation, and guides the elliptically polarized light to the second retardation film 13. The second retardation film 13 converts the reflected light into linearly polarized light in the same polarization direction as that of the linearly polarized light having been incident on the film 13 on the first half toward the first retardation film 12. The first retardation film 12 also converts the light into linearly polarized light in the same polarization direction as that of the linearly polarized light having been incident on the film 12 on the first half to return it to the linearly polarizing plate 11. Since the polarizing plate 11 has an absorption axis perpendicular to the polarization direction of the linearly polarized light, the light incident from the first retardation film 12 passes through the plate and comes out of the screen of the device 100, and thus the white display is presented.

In the case of halftone display, the liquid crystal layer 14 and the second retardation film 13 provide the retardation corresponding to a halftone color or brightness to be displayed, and returns to the first retardation film 12 elliptically polarized light with a vibration component corresponding to the retardation. In this way, the polarizing plate 11 receives a linearly polarized light component perpendicular to the absorption axis corresponding to the color or brightness, which comes out of the screen, and the halftone display is implemented.

As described above, basically, the liquid crystal layer 14 provides the retardation corresponding to zero in the black display, while providing the retardation of $f\acute{E}/4$ in the white display. In other words, the layer 14 provides variations in retardation in a range of 0 to $f\acute{E}/4$ from the black display to white display. According to the variations, opposite states are allowed to be provided in the front polarizing plate 11 such that light is incident in the polarization direction parallel or perpendicular to the absorption axis of the plate 11, thus implementing the black display and white display. In the halftone display, there are provided an intermediate retardation of the liquid crystal layer and an intermediate state of the incident light in the polarizing plate between the black display and white display.

In this embodiment, to make a layer thickness (so-called cell thickness or cell gap) of the liquid crystal layer 14 greater than a standard one leads to such an implementation that the liquid crystal layer 14 is applied with a modified high voltage lower than a conventional voltage to provide the retardation of 0 in the black display, and the liquid crystal layer 14 is applied with a modified low voltage higher than a conventional voltage to provide the retardation of $f\acute{E}/4$ in the white display.

Figure 3:
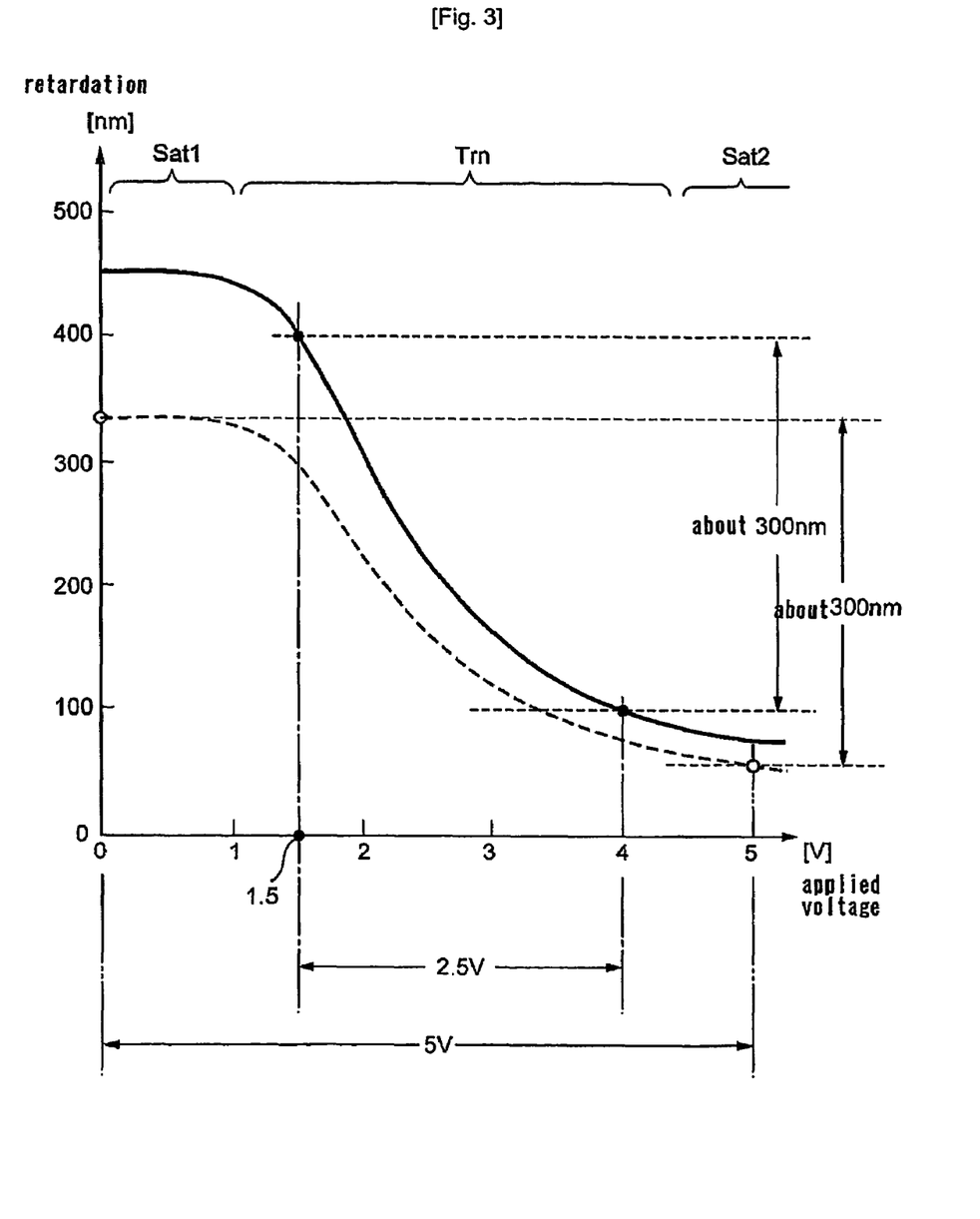
FIG. 3 is a graph showing applied voltage vs. retardation characteristics when a thickness of a liquid crystal layer used in a liquid crystal display device of FIG. 1 is changed.

FIG. 3 is a graph for specifically explaining the modified high voltage and modified low voltage, showing applied voltage vs. changes in retardation in the liquid crystal layer 14.

In FIG. 3, the broken line shows a characteristic of a conventional liquid crystal layer, while the solid line shows a characteristic of the liquid crystal layer 14 according to this embodiment. It is understood that the retardation of the liquid crystal layer 14 of this embodiment provides a greater maximum value than in the conventional layer and relatively steeper changes. This is because the thickness of the liquid crystal layer 14 is increased. More specifically, this is attributed to the fact that the layer 14 has the thickness required for providing a retardation of 150 nm to 200 nm, for the transmissive light in the single-direction light path in the black display. In contrast thereto, the conventional layer has the thickness required for providing a retardation of about 125 nm for such light.

As in the construction shown in FIG. 1, a liquid crystal layer needs to provide the retardation change corresponding to a value of substantially $f\acute{E}/2(=(f\acute{E}/4)\times2)$ for light that passes through the liquid crystal layer twice on the first and second halves of light paths, and when the value is assumed to be about 300 nm, the change has been implemented conventionally by a difference between retardations of an upper voltage of 5 V and a lower voltage of 0 V. In other words, when the voltage to be applied to the liquid crystal layer is increased from 0 V gradually, the liquid crystal molecules undergo a saturation region (Sat1) where the molecules do not undergo displacement from the initial alignment for a while, start changing the alignment when the voltage reaches a predetermined threshold, undergo a transition region (Tm) where the molecules change the alignment with an amount of displacement corresponding to the applied voltage, decrease the amount of displacement gradually, and finally reach a saturation region (Sat2) where the alignment does not change even by further increasing the applied voltage. In such a phenomenon, conventional driving voltage values are voltage values in respective saturation regions in the initial stage and in the end stage in the phenomenon.

In contrast thereto, in this embodiment, the liquid crystal layer 14 is thickened, and changes in retardation are thereby made steeper in the transition region (Trn) of voltage vs. retardation, whereby a required difference ($f\acute{E}/2$) in retardation is implemented by an upper voltage (modified high voltage) lower and a lower voltage (modified low voltage) higher than respective conventional voltages. In this embodiment, the upper voltage is set at 4 V, while the lower voltage is set at 1.5 V.

By this means, it is possible to lower the maximum driving voltage for the liquid crystal layer while maintaining changes in retardation necessary for the black display to white display. Accordingly, it is possible to reduce not only the power consumed in the liquid crystal layer as a load but also power consumption in amplifiers or the like for supplying the maximum voltage. In addition, this embodiment intended to increase the lower voltage from 0 V to 1.5 V, so that it is possible to narrow a driving voltage range as compared to the conventional one, providing a preferable result of suppression of voltage supply energy.

Thus, according to this embodiment, only by changing the thickness of the liquid crystal layer, the driving voltage energy is reduced and reduction of power consumption is implemented. This means implementation of the steepness in a voltage vs. retardation characteristic as shown in FIG. 3 irrespective of materials of the liquid crystal layer. Consequently, this embodiment provides a power saving technique with high reliability and with effectiveness for existing stable liquid crystal materials or liquid crystal materials to be found in future without relying on new liquid crystal materials.

In the aforementioned embodiment, changing the thickness of the liquid crystal layer implements the steepness in a voltage vs. retardation characteristic. Further, implementation of reduction in driving voltage energy can be achieved similarly by changing a pre-tile angle of liquid crystal molecules of the liquid crystal layer as described below.

Figure 4:
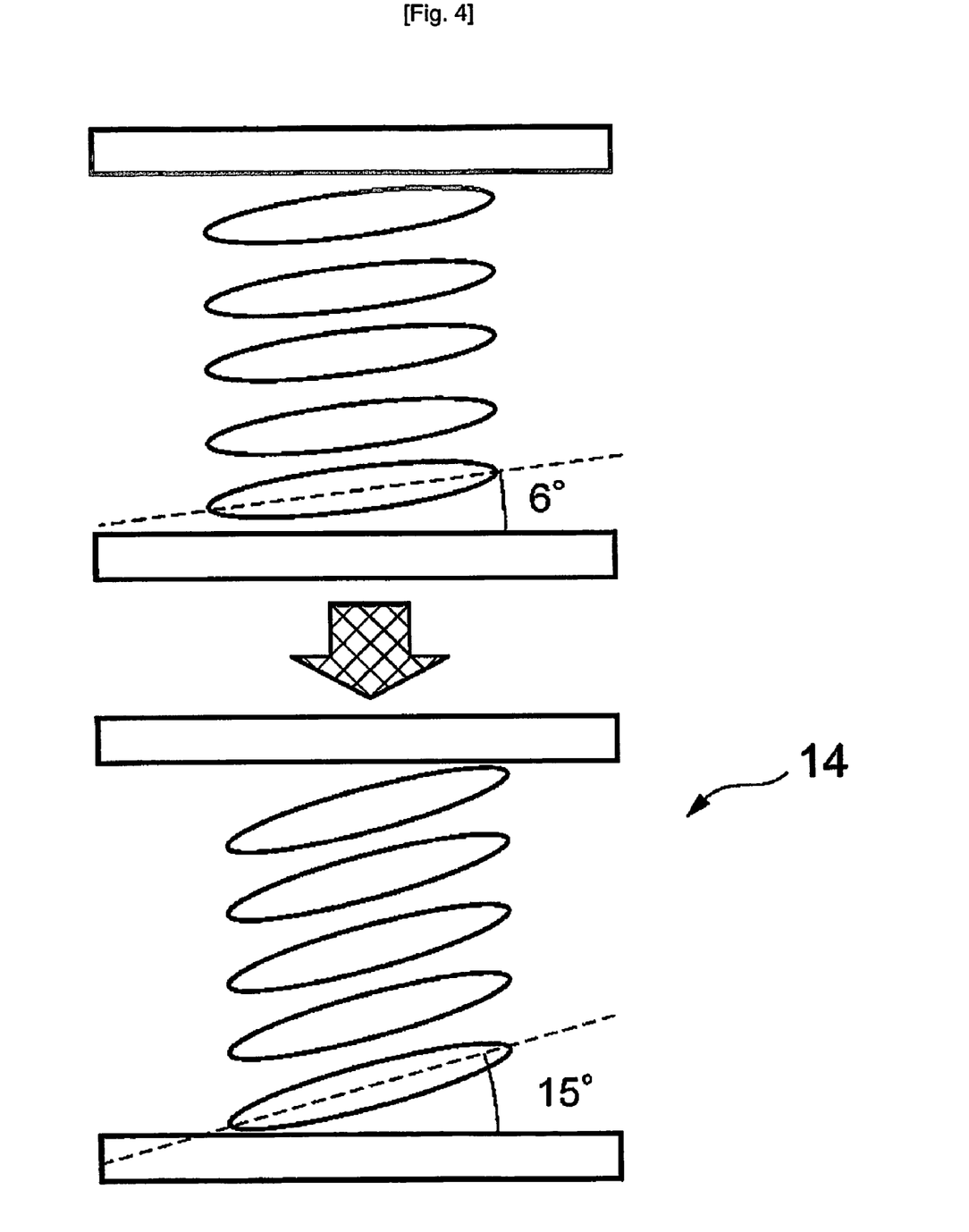
FIG. 4 is a diagrammatic illustration showing modification of a pre-tilt angle of liquid crystal molecules of a liquid crystal layer used in a liquid crystal display device of FIG. 1.
Figure 5:
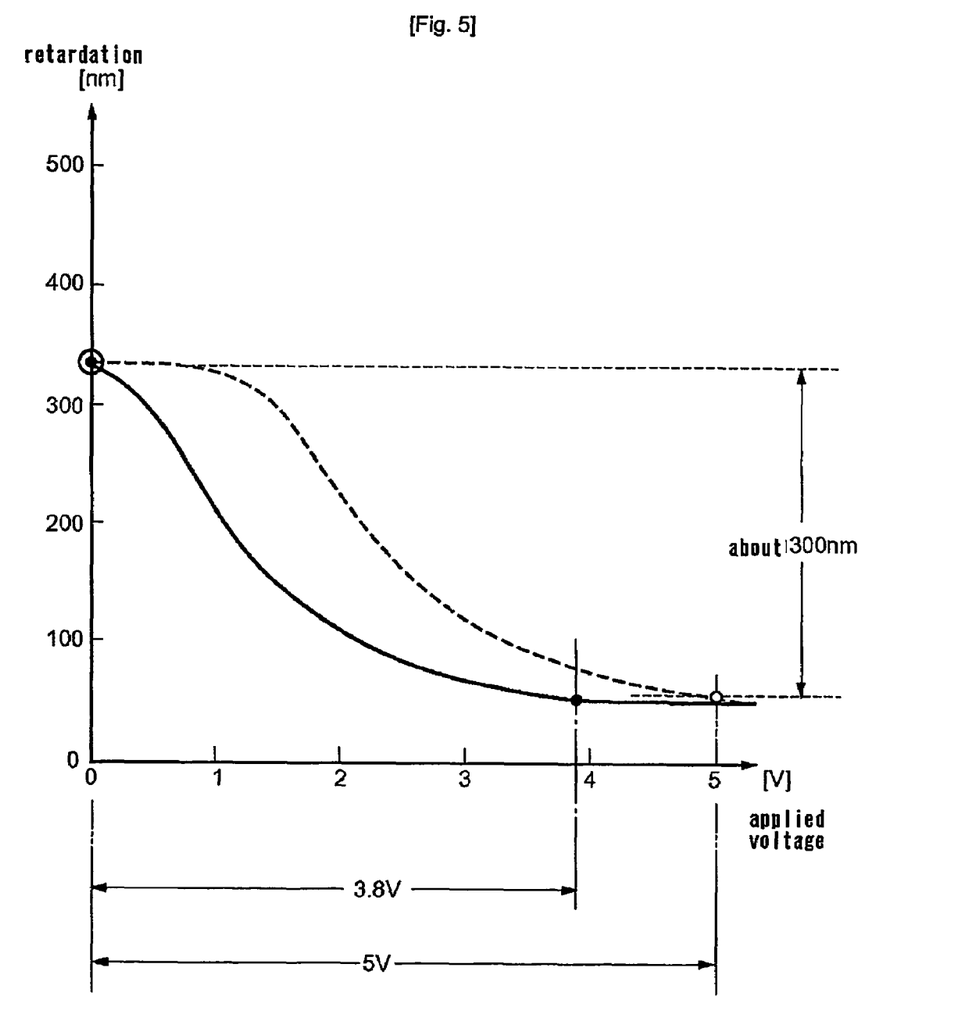
FIG. 5 is a graph showing applied voltage vs. retardation characteristics when a pre-tilt angle of liquid crystal molecules of a liquid crystal layer used in a liquid crystal display device of FIG. 1 is changed.

FIG. 4 schematically shows a situation in which a pre-tilt angle of liquid crystal molecules of the liquid crystal layer 14 is changed from the conventional angle 6° to 15° in this embodiment FIG. 5 shows retardation characteristics provided by the liquid crystal layer with the pre-tile angle of 6° and the liquid crystal layer of the liquid crystal layer with the pre-tile angel of 15° in the respective broken curve and solid curve, similarly to in FIG. 3.

As shown in FIG. 5, particularly as can be seen from comparison with FIG. 3, the characteristic curve of voltage vs. retardation of the pre-tilt angle of 15° exhibits a form shifted to a lower voltage side (in other words, form in which the threshold voltages are lowered). Accordingly, in this embodiment, provision of a predetermined required retardation difference of about 300 nm is implemented by setting the upper voltage and lower voltage respectively at 3.8 V and 0 V.

Thus, it is also possible to decrease the driving voltage while maintaining required retardations by increasing the pre-tile angle as in this embodiment. Also in this method, it is possible to narrow the driving voltage range (3.8 V) as compared to one of the conventional technique, and the voltage supply energy is also suppressed. Further, such effectiveness can be expected independently of material characteristics of a liquid crystal layer.

Although the pre-tilt angle is 15° in this embodiment, other values may be applied, and satisfactory results are obtained with the pre-tilt angle being up to an upper limit of 30°.

Second Embodiment

Figure 6:
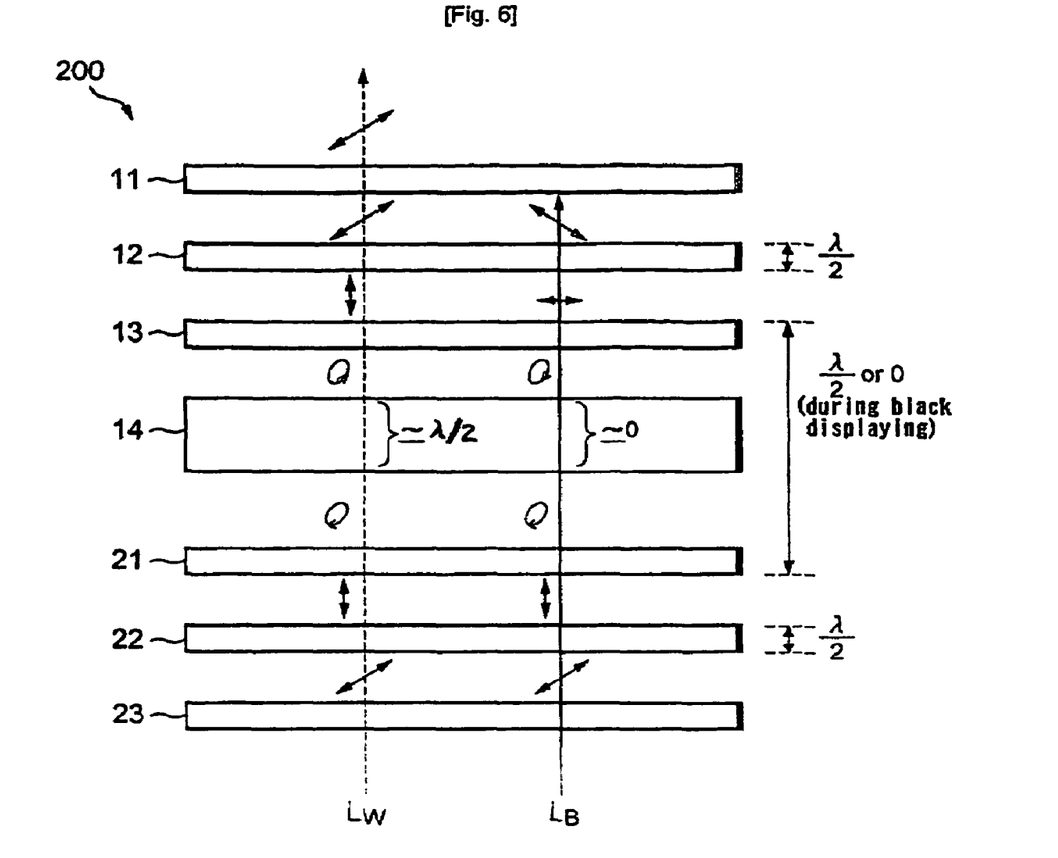
FIG. 6 is a cross sectional view showing a general construction of a liquid crystal display device according to another embodiment of the invention.

FIG. 6 schematically shows a cross sectional construction of a liquid crystal display device according to another embodiment of the invention.

A liquid crystal display device 200 is a transmissive type liquid crystal display device, and has: the linearly polarizing plate 11; the first retardation film 12 that is a half-wave plate; the second retardation film 13 that is a quarter-wave plate; the liquid crystal layer 14 which is sandwiched by a pair of electrodes (not shown) that apply a voltage corresponding to pixel information to be displayed to the layer 14; a third retardation film 21 that is a quarter-wave plate; a fourth retardation film 22 that is a half- wave plate; and a rear linearly polarizing plate 23. The linearly polarizing plate 11, the first and second retardation films 12, 13 form means having one of the right-hand and left-hand circularly polarizing functions, and the third and fourth retardation films 21, 22 and the rear linearly polarizing plate 23 form means having the other one of the right-hand and left-hand circularly polarizing functions. It is noted that the same portions as in the First Embodiment are assigned the same reference symbols and description of their details are omitted. In addition, also for the sake of clarity, only principal structural elements are given herein.

The first retardation film 12 has a value of $fÉ/2$ in the same way as described above, and the liquid crystal layer 14 also has a liquid crystal material of the parallel alignment type as described earlier.

This embodiment is arranged to provide the third and fourth retardation films 21, 22 and another linearly polarizing plate 23, instead of the optical reflective layer 15 in the First Embodiment. The second retardation film 13, liquid crystal layer 14 and third retardation film 21 are intended to have, as a whole, a retardation of substantially one-second the wavelength ($fÉ/2$) of incident light or a retardation equivalent to zero in the black display operation (dark state) of the device 200. The fourth retardation film 22 has a fixed retardation of substantially half the wavelength ($fÉ/2$) of the incident light Light from backlight (not shown) is applied from a further backside of the rear polarizing plate 23.

As shown by a solid line $L_B$ in FIG. 6, the backlight light incident on the liquid crystal display device 200 first passes through the linearly polarizing plate 23 to be linearly polarized light, next passes through the fourth retardation film 22 with it provided with the retardation of $fÉ/2$, and becomes linearly polarized light in a changed predetermined direction. Then, the linearly polarized light enters the third retardation film 21 to be right-hand (or left-hand) elliptically polarized light, and is guided to the liquid crystal layer 14. In the black display operation (dark state), the retardation of the liquid crystal layer 14 is nearly zero (however, in this example, about in a range of 60 nm to 160 nm to obtain elliptically polarized light with the same shape as that of the incident light), and the elliptically polarized light incident on the liquid crystal layer 14 is guided to the second retardation film 13 with its direction of elliptical polarization remained the same. The second retardation film 13 converts the transmitted elliptically polarized light into linearly polarized light in the predetermined direction. The linearly polarized light is then provided with the retardation of $fÉ/2$ by the first retardation film 12, thereby the polarization direction being changed, and guided to the front polarizing plate 11. Since the polarizing plate 11 has an absorption axis just parallel to the polarization direction of the linearly polarized light, the light entering from the first retardation film 12 is intercepted (absorbed) without coming out of a screen of the device 200, and thus the black display is presented.

Meanwhile, in the white display operation (bright state), as shown by a broken line $L_W$ in FIG. 6, right-hand (or left-hand) elliptically polarized light is incident on the liquid crystal layer 14 likewise. At this point, the liquid crystal layer 14 exerts a retardation of $fÉ/2$ (about 300 nm to 500 nm), and guides to the second retardation film 13 elliptically polarized light in a direction inverse of the direction of the elliptically polarized light incident on the layer 14. The second retardation film 13 converts the transmitted light into linearly polarized light in a polarization direction perpendicular to that in the black display to guide it to the first retardation film 12. The light guided to the first retardation film 12 is provided with a retardation of $fÉ/2$, thereby to become linearly polarized light with its polarization direction being changed, which is guided to the front polarizing plate 11. Since the polarizing plate 11 has an absorption axis perpendicular to the polarization direction of the linearly polarized light, the light entering from the first retardation film 12 passes through the plate 11 and comes out of the screen of the device 200, whereby the white display is presented.

In the case of halftone display, the liquid crystal layer 14 and the second and third retardation films 13 and 21 present the retardation corresponding to a halftone color or brightness to be displayed, and input to the first retardation film 12 elliptically polarized light with a vibration component corresponding to the retardation. In this way, the polarizing plate 11 receives a linearly polarized light component perpendicular to the absorption axis corresponding to the color or brightness, which comes out of the screen, and the halftone display is implemented.

Even in this embodiment, it is possible to provide a voltage vs. retardation chararacteristic with a steepness characteristic by changing the thickness of the liquid crystal layer 14, and/or decrease a threshold voltage of the retardation characteristic by changing the pre-tilt angle of liquid crystal molecules of the liquid crystal layer 14. The retardation involved with light passing through the liquid crystal layer 14 twice in the First Embodiment is equal to the retardation involved with light passing through the liquid crystal layer 14 only once in this embodiment, and therefore, it is possible to set the thickness of the liquid crystal layer and pre-tilt angle of liquid crystal molecules in the same purport as in the foregoing.

Thus, also in this embodiment, it is possible to decrease the driving voltage energy and contribute to reduction in power consumption.

Third Embodiment

Figure 7:
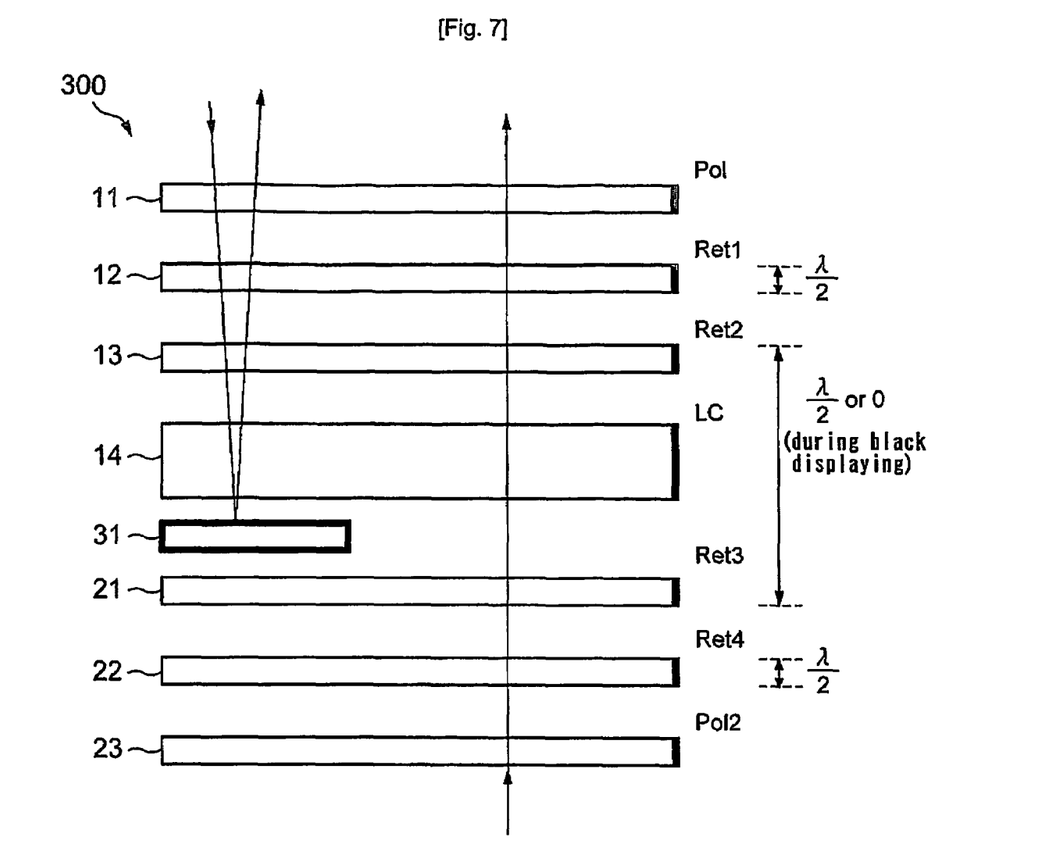
FIG. 7 is a cross sectional view showing a general construction of a liquid crystal display device according to a further embodiment of the invention.

FIG. 7 schematically shows a cross sectional construction of a liquid crystal display device according to a further embodiment of the invention.

A liquid crystal display device 300 is a transflective type liquid crystal display device, and basically has the construction having an optical reflective layer 31 arranged between the liquid crystal layer 14 and the third retardation film 21 in addition to the construction of the transmissive type liquid crystal display device 200 as described above. The optical reflective layer 31 basically forms a reflective area within each pixel, and the other area is formed as a transmissive area The optical reflective layer 31 may be formed to also serve as a pixel electrode.

The other structural aspect and behavior of incident light can be described in the same way as in the reflective type liquid crystal display device 100 and transmissive type liquid crystal display device 200 respectively described in the First and Second Embodiments. In other words, the behavior of light reflected by the optical reflective layer 31 is the same as in the reflective type liquid crystal display device 100, and the behavior of light from the backlight passing through a portion other than the layer 31 i.e., the transmissive area is the same as in the transmissive type liquid crystal display device 200.

According to this embodiment, the same effects and advantages as in the above-mentioned First and Second Embodiments can be expected.

In the foregoing, two schemes are separately described, one relying on a thickness of the liquid crystal layer and the other relying on pre-tilt angle, respectively, but it may be possible to decrease the driving voltage energy by combining these schemes.

Besides, the upper voltage (modified high voltage) and lower voltage (modified low voltage) are set within the transition region (Trn) in FIG. 3, while being set at end portions of the saturation regions in FIG. 5, but it can be determined at which positions they are set in the retardation characteristic as appropriate. It should be noted that the present invention has an essence in that a difference between a first retardation obtained by applying the liquid crystal layer with a modified high voltage lower than a predetermined high voltage (for example, the upper saturated voltage) specified prior to changing a thickness of the liquid crystal layer or a pre-tilt angle and a second retardation obtained by applying the liquid crystal layer with a modified low voltage equal to or higher than a predetermined low voltage (for example, the lower saturate voltage) specified prior to the changing, or a difference between a first retardation obtained by applying the liquid crystal layer with a modified high voltage equal to or lower than the predetermined high voltage and a second retardation obtained by applying the liquid crystal layer with a modified low voltage higher than the predetermined low voltage is equal to a predetermined difference of retardation which has been set for presenting bright to dark states before the changing.

Furthermore, although the aforementioned embodiments adopt the liquid crystal layer of the parallel alignment type as shown in FIG. 2, the present invention is not limited to such a type of liquid crystal layer. For example, the present invention is applicable to liquid crystal layers of various types such as ECB (Electrically Controlled Birefringence) type, HANiHybrid Aligned Nematicjtype, OCB (Optically Compensated Birefringence) type, and VAN (Vertically Aligned Nematic) type. In short, the invention focuses its target on a liquid crystal layer of a type in which optical modulation is performed in accordance with an image to be displayed by controlling a state of birefringence based on an electric field.

In the foregoing, the embodied forms of the present invention have been described, but they can course be modified in various kinds of ways. Further, additional structural elements may be added to the liquid crystal device for implementation. Furthermore, it is noted that technical features specific to the embodiments are expressed using terms such as gslow axish, galignment directionh, gperpendicularh and gparallelh, but they may be expressed using other terms, so that the present invention is directed to the true sense of the technical features translated from the terms. Moreover, the embodiments have been described with respect to liquid crystal display devices, but the present invention may be not necessarily limited to devices for use in displaying images etc. and is applicable to various types of devices provided with a liquid crystal layer.

The present invention is not necessarily limited to the above-mentioned embodiments, and it would be apparent that those skilled in the art could derive various modifications thereof without departing from the scope of claims.

The invention claimed is:

1. An optical modulation method for a liquid crystal layer, in reference to a reference liquid crystal layer characterized by having one retardation through application of a predetermined high voltage and an other retardation through application of a predetermined low voltage, whereby a predetermined difference between the one and the other retardations can provide predetermined dark and bright states, comprising:

making a thickness of the liquid crystal layer and/or a pre-tilt angle of liquid crystal molecules of the liquid crystal layer to be greater than that of the reference liquid crystal layer, the same value of the predetermined difference in retardation is obtained by a first retardation obtained by applying the liquid crystal layer with a modified high voltage lower than the predetermined high voltage and a second retardation obtained by applying the liquid crystal layer with a modified low voltage equal to or higher than the predetermined low voltage, or by a first retardation obtained by applying the liquid crystal layer with a modified high voltage equal to or lower than the predetermined high voltage and a second retardation obtained by applying the liquid crystal layer with a modified low voltage higher than the predetermined low voltage.

2. An optical modulation method as defined in claim 1, wherein a difference between the predetermined high voltage and the predetermined low voltage is substantially 5V.

3. A liquid crystal device comprising:

a front polarizing plate, a liquid crystal layer and an optical reflective layer are arranged in this order from the front side of the device, the liquid crystal layer having a thickness determined in reference to a reference liquid crystal layer that is characterized by having one retardation when the reference liquid crystal layer is applied with a predetermined high voltage and an other retardation when the reference liquid crystal layer is applied with a predetermined low voltage, for light that is incident from the front polarizing plate, passes through the reference liquid crystal layer, reflects on the optical reflective layer, passes again through the reference liquid crystal layer and is guided to the front polarizing plate, whereby a bright state and a dark state can be presented based on a predetermined difference between these retardations, wherein the thickness of the liquid crystal layer and/or a pre-tilt angle of liquid crystal molecules of the liquid crystal layer is made to be greater than that of the reference liquid crystal layer, so that a same value of the predetermined difference in retardation is obtained by a first retardation obtained by applying the liquid crystal layer with a modified high voltage lower than the predetermined high voltage and a second retardation obtained by applying the liquid crystal layer with a modified low voltage equal to or higher than the predetermined low voltage, or by a first retardation obtained by applying the liquid crystal layer with a modified high voltage equal to or lower than the predetermined high voltage and a second retardation obtained by applying the liquid crystal layer with a modified low voltage higher than the predetermined low voltage is made to be a value of substantially quarter of a wavelength of the light.

4. A liquid crystal device as defined in claim 3, comprising phase compensation means between the front polarizing plate and the liquid crystal layer.

5. A liquid crystal device as defined in claim 3, wherein the liquid crystal layer consists of a liquid crystal material including liquid crystal molecules forming one surface of the liquid crystal layer and liquid crystal molecules forming another surface of the liquid crystal layer, each alignment direction of the molecules being substantially parallel to the other.

6. A liquid crystal device as defined in claim 3, wherein the liquid crystal layer consists of a liquid crystal material of a parallel alignment type, and has a thickness which provides a retardation of 300 to 500 nm for the light under no application of electric field.

7. A liquid crystal device as defined in claim 3, wherein the liquid crystal layer consists of a liquid crystal material of parallel alignment type, and a pre-tilt angle of liquid crystal molecules of the liquid crystal layer is from 6 to 30 degrees.

8. A liquid crystal device as defined in claim 3, wherein a difference between the predetermined high voltage and the predetermined low voltage is substantially 5V.

9. A liquid crystal device as defined claim 3, wherein a difference between the modified high voltage and the modified low voltage is substantially 2.5V.

10. A liquid crystal device as defined in claim 3, wherein at least one of the modified high voltage and the modified low voltage is in a transition area between the vicinity of value of the first retardation and the vicinity of value of the second retardation on a characteristic curve of voltage vs. retardation or its equivalent characteristic curve which is shown by the liquid crystal layer whose thickness and/or pre-tilt angle has been made to be increased so as to present the first and second retardations.

11. A liquid crystal device, comprising:
a front polarizing plate, a liquid crystal layer and a rear polarizing plate are arranged in this order from the front side of the device, the liquid crystal layer having a thickness determined in reference to a reference liquid crystal layer that is characterized by having one retardation when the reference liquid crystal layer is applied with a predetermined high voltage and an other retardation when the reference liquid crystal layer is applied with a predetermined low voltage, for light that is incident from the rear polarizing plate, passes through the reference liquid crystal layer, and is guided to the front polarizing plate, whereby a bright state and a dark state can be presented based on a predetermined difference between these retardations, wherein the thickness of the liquid crystal layer and/or a pre-tilt angle of liquid crystal molecules of the liquid crystal layer is made to be greater than that of the reference liquid crystal layer, so that a same value of the predetermined difference in retardation is obtained by a first retardation obtained by applying the liquid crystal layer with a modified high voltage lower than the predetermined high voltage and a second retardation obtained by applying the liquid crystal layer with a modified low voltage equal to or higher than the predetermined low voltage, or by a first retardation obtained by applying the liquid crystal layer with a modified high voltage equal to or lower than the predetermined high voltage and a second retardation obtained by applying the liquid crystal layer with a modified low voltage higher than the predetermined low voltage is made to be a value of substantially half of a wavelength of the light.

12. A liquid crystal device as defined in claim 11, comprising phase compensation means between the liquid crystal layer and the rear polarizing plate.

13. A liquid crystal device as defined in claim 11, further comprising an optical reflective layer between the liquid crystal layer and the rear polarizing plate and partially formed in an area along a primary surface of the liquid crystal layer facing the rear polarizing plate, wherein an area corresponding to the optical reflective layer is used for an optical reflective area within a pixel, and other area than the optical reflective area is used for an optical transmissive area within the pixel.

* * * * *